(12) United States Patent
Zhou et al.

(10) Patent No.: US 8,170,303 B2
(45) Date of Patent: May 1, 2012

(54) AUTOMATIC CARDIAC VIEW CLASSIFICATION OF ECHOCARDIOGRAPHY

(75) Inventors: Shaohua Kevin Zhou, Plainsboro, NJ (US); Jin-hyeong Park, Princeton, NJ (US); Joanne Otsuki, Oakland, CA (US); Dorin Comaniciu, Princeton Junction, NJ (US); Bogdan Georgescu, Plainsboro, NJ (US); Constantine Simopoulos, San Francisco, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 968 days.

(21) Appl. No.: 11/775,538

(22) Filed: Jul. 10, 2007

(65) Prior Publication Data
US 2009/0034808 A1    Feb. 5, 2009

Related U.S. Application Data

(60) Provisional application No. 60/806,812, filed on Jul. 10, 2006.

(51) Int. Cl.
*G06K 9/00* (2006.01)
(52) U.S. Cl. ................. 382/128; 382/224
(58) Field of Classification Search .......... 382/128, 382/131, 224
See application file for complete search history.

(56) References Cited

U.S. PATENT DOCUMENTS

| 7,088,851 B2 * | 8/2006 | Shinbata ............. 382/132 |
| 7,695,439 B2 * | 4/2010 | Jackson et al. ....... 600/450 |
| 7,744,532 B2 * | 6/2010 | Ustuner et al. ....... 600/437 |
| 2006/0171586 A1 | 8/2006 | Georgescu et al. |

OTHER PUBLICATIONS

Schapire and Singer "Improved boosting using confidence-rated predictions" Machine Learning, 37(3):297-336, 1999.*
Grzegorzek et al., "How fusion of multiple views can improve object recognition in real-world environments"Proceedings of the Vision, Modeling, and Visualization Conference 2003 (VMV 2003), München, Germany, Nov. 19-21, 2003.*
Saisan et al. "Multi-View Classifier Swarms for Pedestrian Detection and Tracking" IEEE Computer Society Conference on Computer Vision and Pattern Recognition, Workshops 2005, Jun. 2005.*
Friedman, J. et al., "Additive Logistic Regression: a statistical view of boosting," *Ann. Statist.*, (2000) pp. 337-407, 28:2.
Viola, P. et al., "Rapid Object Detection Using a Boosted Cascade of Simple Features" *In CVPR*, (2001) pp. 511-518.
Zhou S., et at., "Image-based regression using boosting method" *In Proc. Intl. Conf. Computer Vision (ICCV)*, (2005).
Zhou S., et al. "image-based multiclass boosting and echocardiographic view classification," *In IEEE Conf. Computer Vision and Pattern Recognition (CVRP)*, 2006.
Zhou, X. et al., "An information fusion framework for robust shape tracking," *PAMI*, (2005) pp. 115-129, 27:1.

* cited by examiner

*Primary Examiner* — Stephen R Koziol (57) ABSTRACT

A method for view classification includes providing a frame of an object of interest, detecting a region of interest within the object of interest for each of a plurality of detectors (e.g., binary classifiers), wherein each binary classifier corresponds to a different view, performing a global view classification using a multiview classifier for each view, outputting a classification for each view, fusing outputs of the multiview classifiers, and determining and outputting a classification of the frame based on a fused output of the multiview classifiers.

18 Claims, 5 Drawing Sheets

AUTOMATIC CARDIAC VIEW CLASSIFICATION OF ECHOCARDIOGRAPHY

CROSS-REFERENCE TO RELATED APPLICATION

This application claims priority to U.S. Provisional Application Ser. No. 60/806,812, filed on Jul. 10, 2006, which is herein incorporated by reference in its entirety.

BACKGROUND OF THE INVENTION

1. Technical Field

The present invention relates to image rendering, and more particularly to a system and method for automatic system that performs cardiac view classification of echocardiography.

2. Discussion of Related Art

There is a growing need to automate the process of echocardiographic image analysis that involves many tasks such as view classification, wall motion analysis, measurement computation, automatic placement of Doppler gate, etc.

Therefore, a need exists for an automatic system that performs cardiac view classification of echocardiography.

SUMMARY OF THE INVENTION

According to an embodiment of the present disclosure, a method for view classification includes providing a frame of an object of interest, detecting a region of interest within the object of interest for each of a plurality of detectors, wherein each detector corresponds to a different view, performing a global view classification using a multiview classifier for the region of interest for each view, outputting a classification for each view, fusing an output of the multiview classifiers, and determining and outputting a classification of the frame based on a fused output of the multiview classifiers.

According to an embodiment of the present disclosure, a method for training a view-based classifier includes providing a plurality of frames of an object of interest at a plurality of views of the object of interest, learning a detector (binary classifier) for a region of interest in each view, constructing a plurality of global templates corresponding to each view using the binary classifiers, and learning a view-based multi-class classifier based on the global templates.

According to an embodiment of the present disclosure, a system for view classification includes a memory device storing a plurality of instructions embodying a multiview classifier, a processor for receiving an image frame including an object of interest to be classified and executing the detector to perform a method comprising detecting a region of interest within the object of interest for each of a plurality of binary classifiers, wherein each binary classifier corresponds to a different view, performing a global view classification using a multiview classifier for the region of interest for each view, outputting a classification for each view, fusing an output of the multiview classifiers; and determining and outputting a classification of the frame based on a fused output of the multiview classifiers

BRIEF DESCRIPTION OF THE DRAWINGS

Preferred embodiments of the present invention will be described below in more detail, with reference to the accompanying drawings.

DETAILED DESCRIPTION OF EXEMPLARY EMBODIMENTS

According to an embodiment of the present disclosure, an automatic system that performs cardiac view classification (CVC) of echocardiography: Given an echocardiographic video sequence, the system outputs a view label among standard views. A hybrid machine learning approach is used that extracts knowledge from an annotated database. In an exemplary implementation, four standard cardiac views were classified: apical four chamber and apical two chamber, parasternal long axis and parasternal short axis (at mid cavity). A bounding box is provided for the left ventricle.

Figure 1A:
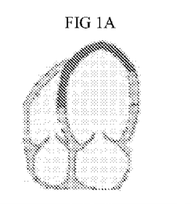
FIGS. 1A-H are illustrations and examples of images for four views according to an embodiment of the present disclosure.
Figure 1B:
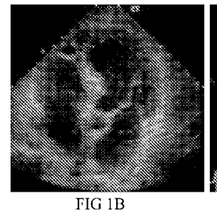
Figure 1C:
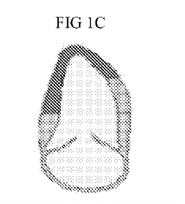
Figure 1D:
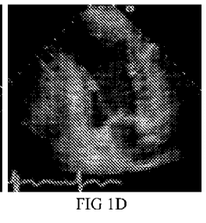
Figure 1E:
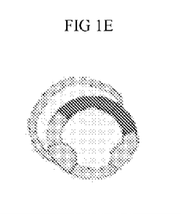
Figure 1F:
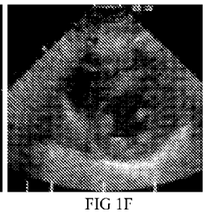
Figure 1G:
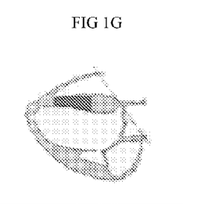
Figure 1H:
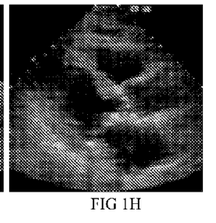

The CVC uses echocardiography and different cardiac views. The cardiac views includes apical four chamber (A4C) (see for example, FIGS. 1A-B) and apical two chamber (A2C) views (see for example, FIGS. 1C-D), a parasternal short axis (SAX) view at mid cavity (see for example, FIGS. 1E-F) and a parasternal long axis (LAX) view (see for example, FIGS. 1G-H). As shown herein, the approach is scalable to handle more than four views.

There are several challenges in building a robust CVC system, including within-view variation, between-view variation, structure localization and computation.

Referring to within-view variation; the image appearance of echocardiography belonging to the same cardiac view characterizes significant variations, which make it challenging to achieve high view classification accuracy. The variations arise from speckle noise inherent to ultrasound imaging modality, patient individuality, instrument difference, sonographer dependency, etc.

Referring to between-view variation; apart from severe within-view appearance variations, how to characterize the between-view variation is a challenge too. The global view template should provide maximum information about the characteristic chamber structure belonging to the view in a consistent fashion; while discriminating different views. Designing global view templates is very crucial.

Referring to structure localization; to reduce the variation of the global view template, the localization of the chambers (such as ventricles and atria) is a challenge as their positions are unknown. This is an object detection/recognition problem which is an active research question in the computer vision literature. To robust localize the individual chamber, information is utilized at a local scale.

Referring to computation; to make a practical system, real-time requirement should be addressed. How to realize low computational complexity without sacrificing accuracy is an issue.

A hybrid machine learning approach that extracts knowledge from annotated databases integrates evidence from both local and global scales. It utilizes local information to anchor the representative chamber such as left ventricle (LV) which is present in all four views. The global information is used when designing the global templates.

View-specific global templates are designed to accommodate view characteristics based on aligning the representative chamber into canonical positions. Therefore, for a given LV detector associated with a particular view, it can be used to bootstrap examples from training sequence belonging to four views to learn a multiclass classifier. Therefore, for each view, a view-specific multiclass classifier is learned.

The boosting framework is invoked to learn both the LV detectors and multi-class classifiers. Boosting is the state-of-the-art classifier that selects relevant visual features from a huge feature pool and combines them into one committee for a robust decision.

Information fusion is implemented, wherein given that each view has a LV detector and a multiclass classifier and produces its own result. These results are combined into a final output through intelligent information fusion.

For speed consideration, the system ignores temporal information by taking an end-diastolic (ED) frame of the echo sequence as input, and classifies it into one of the learned views. The classification result of the ED frame represents the final view of the echocardiographic video sequence.

Figure 2:
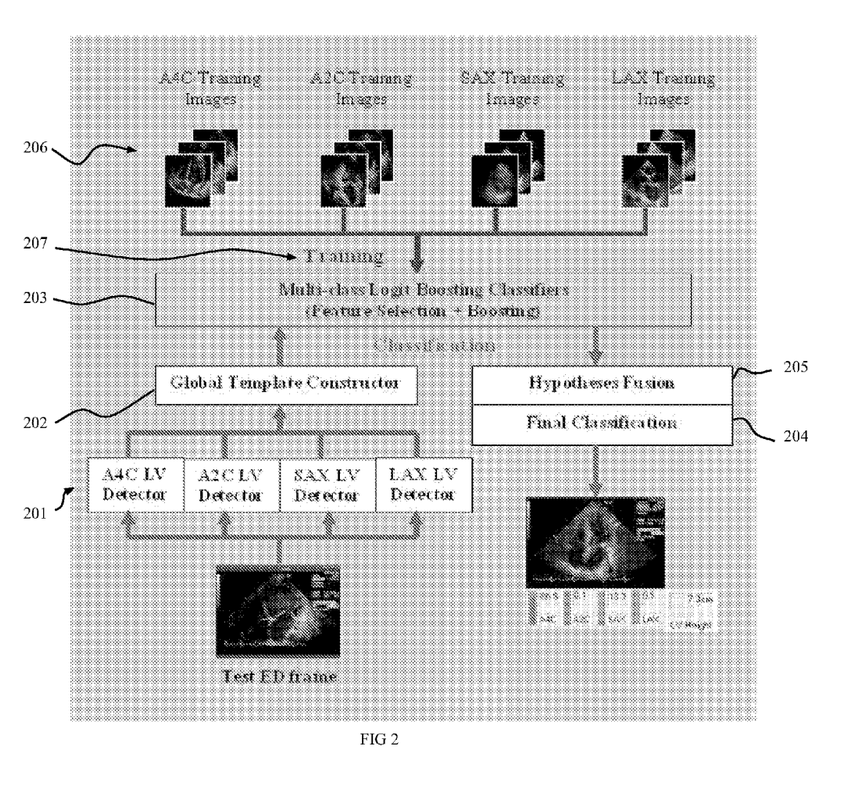
FIG. 2 is a diagram of a CVC system according to an embodiment of the present disclosure.

The CVC system whose schematic illustration is presented in FIG. 2 includes online and offline elements. The online part of the CVC system, which can be roughly divided into three processes including: (i) view-specific LV scanning 201, (ii) view-specific multiclass classification 202, and (iii) fusion of classifier outputs 203. To be specific, the LV is detected using the LV detectors, with each view generating a LV candidate. After detecting the LV, a global template is constructed based on each of the designed templates and feed it into the multi-class classifier learned using the multiclass LogitBoosting algorithm. The final classification 204 is arrived at by combining the multiple hypotheses or multiple detections 205 obtained by the LV detectors.

The offline part of the CVC system includes (1) collecting training data 206 and (2) conducting machine learning 207. Methods for learning the LV detector are well known in the art. It is assumed herein that, for each view, its associated LV detector is available and focus on learning view-specific multiclass classifier.

Referring to learning the LV detector: Given a database with annotated LV contour, a database-guided learning technique is applied to learn the LV detector. Four LV exemplary detectors have been learned for A4C, A2C, SAX, and LAX, one for each view.

Figure 3A:
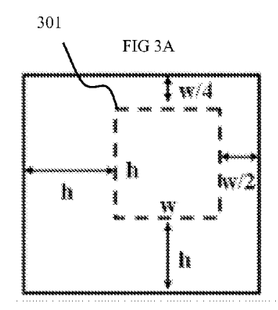
FIGS. 3A-C show global templates for four views according to an embodiment of the present disclosure.
Figure 3B:
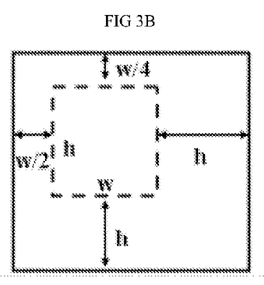
Figure 3C:
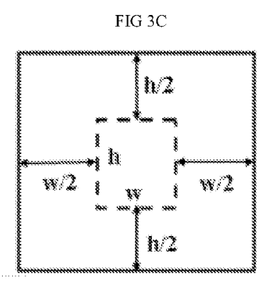

Referring to learning the view-based multiclass classifier and in particular the global view template: As mentioned above, the current CVC system is based on the machine learning approach. Therefore, training images need to be collected for each view. A template layout is designed for each view, which represents the view by normalizing the heart shapes in the training images to minimize the intra-shape difference. Since the LV cavity is the anchoring chamber used in the system, the template design is based on aligning the LV endocardial wall to the canonical location. FIG. 3A-C show the three template prototypes used in the current CVC system for classification of four views, namely A2C/A4C, SAX and LAX, respectively. As shown in FIG. 3A, A2C and A4C share the same template prototype. The LV box in FIG. 3 is a tight bounding box, e.g., 301, of the LV endocardial contour. In the training phase, the knowledge of the LV endocardium is assumed, and is either manually traced or automatically inferred as shown later.

Based on the template layout, the training template images are collected from the training echo video sequences, utilizing the XV ground truth information. The LV contour is parameterized as a set of landmark points uniformly distributed along the contour.

Figure 5:
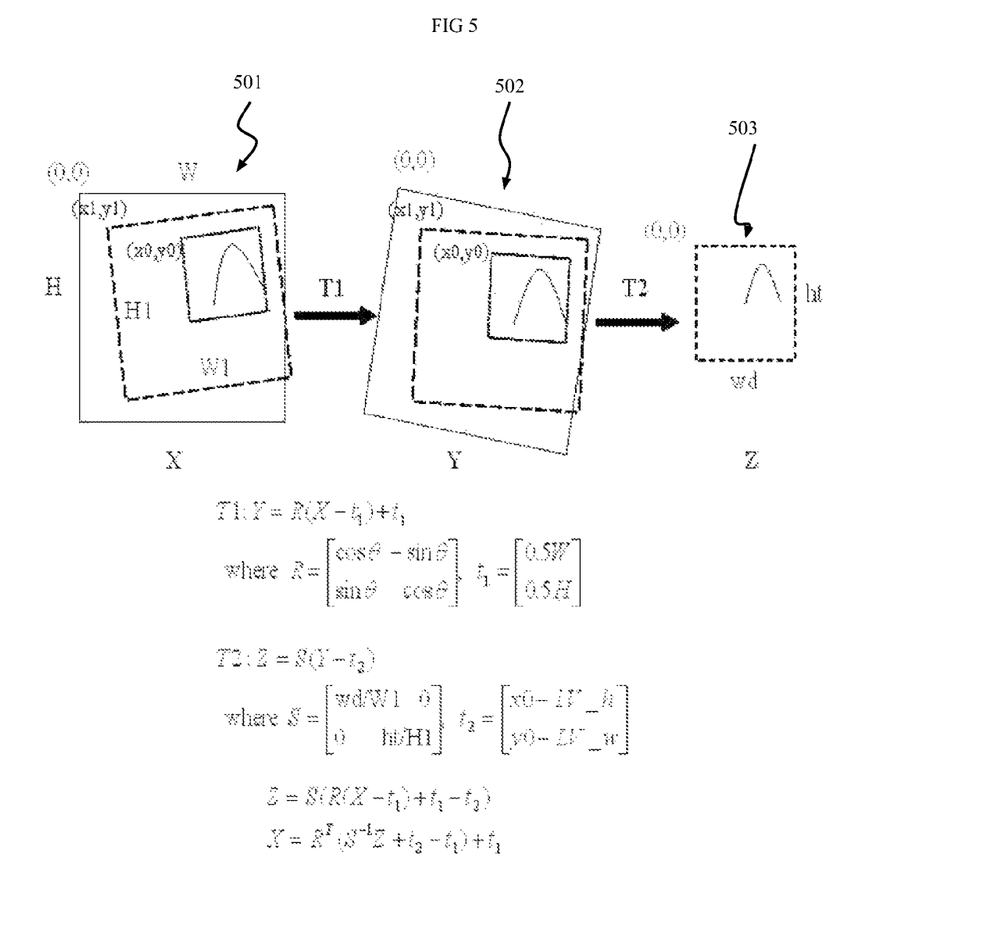
FIG. 5 is a flow chart of a method for template image construction according to an embodiment of the present disclosure.

Referring to FIG. 5, the template image collection procedure can be detailed as follows.

Figure 4A:
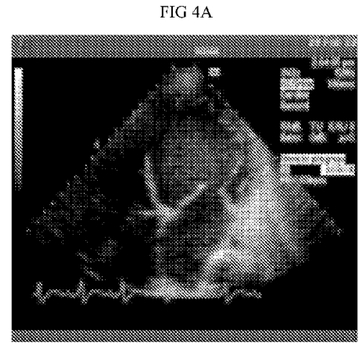
FIG. 4A-D illustrate template image cropping according to an embodiment of the present disclosure.

Given a video sequence, the fan is detected, and the intensity values outside the fan are set to zero to eliminate the unnecessary information 501. As shown in FIG. 4A, there may be text information outside the fan. After detecting the fan, only heart image within the fan is preserved.

Figure 4B:
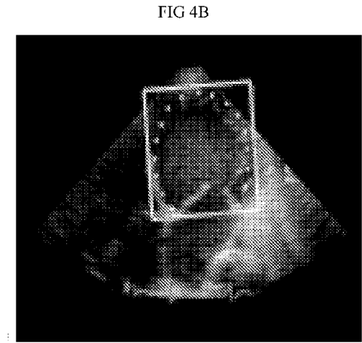
Figure 4C:
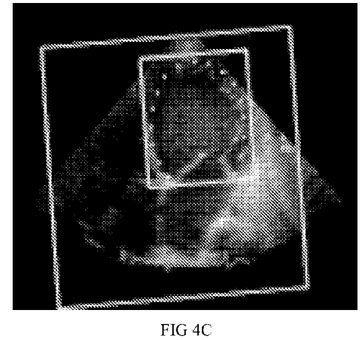
Figure 4D:
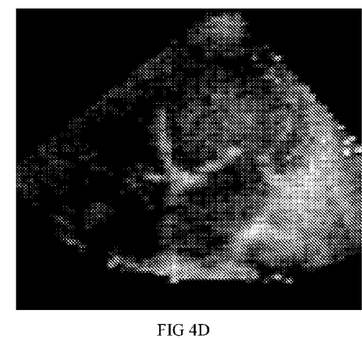

A rotated bounding box of the LV is determined using the ground truth LV contour 502. The orientation of the LV is computed using principal axis analysis of the coordinates. Two principal axes are found. The dominant principal axis is used to compute the rotating angle of the LV. After obtaining the angle, a tight bounding box of the LV is derived. In FIG. 4B, white dots in the form of an oval represent the ground truth landmark points of the LV contour, and the oriented white box is the bounding box of LV computed using principal axis. After finding the bounding box, the global template is determined based on the global template layout as shown in FIG. 3. The outer box in FIG. 4C represents the template bounding box along with the LV bounding box for the A4C global template. FIG. 4D is a cropped global template image.

The template image for training is constructed by cropping and resealing the template bounding box 503. The size of the template images for training is set to the same. FIG. 5 shows the procedure of generating template image of A4C or A2C. An intensity value of each pixel in the template image (denoted by Z in FIG. 5) is obtained from the input image using the two transformations, T1 and T2. The T1 transformation rotates the image to make the LV bounding box has the right angle. The T2 transformation rescales the template bounding box to fit the pre-defined template image size. For each pixel coordinate of the template image (Z), its corresponding coordinate (X) in the input image is computed using T1 and T2 as in FIG. 5. Bilinear interpolation is used for non-integer pixel coordinates. Similarly, the transformations for the SAX and LAX views can be constructed.

To increase robustness, training data are collected from 5 frames centered around the ED frame, e.g., [ED−2, ED+2]. if the range of the frames is out of bound, the range is adjusted to be inside the bound. For example, if the ED frame is the first frame, the first 5 frames are used for training data collection.

The above procedure is valid for echo sequence corresponding to the LV detector. For example, for the A4C LV detector, the above procedure can be applied to the A4C sequences. For a non-A4C sequence (say A2C), the same procedure is not applied because the A4C LV contour for such a sequence is not available. To overcome this challenge, the A4C LV detector is used to scan the ED frame of the non-A4C sequence and obtain a most likely A4C LV candidate region. The sample A4C global template layout is then utilized to generate training images for the A2C view. In this manner, the global training images for all four views can be obtained.

Figure 6:
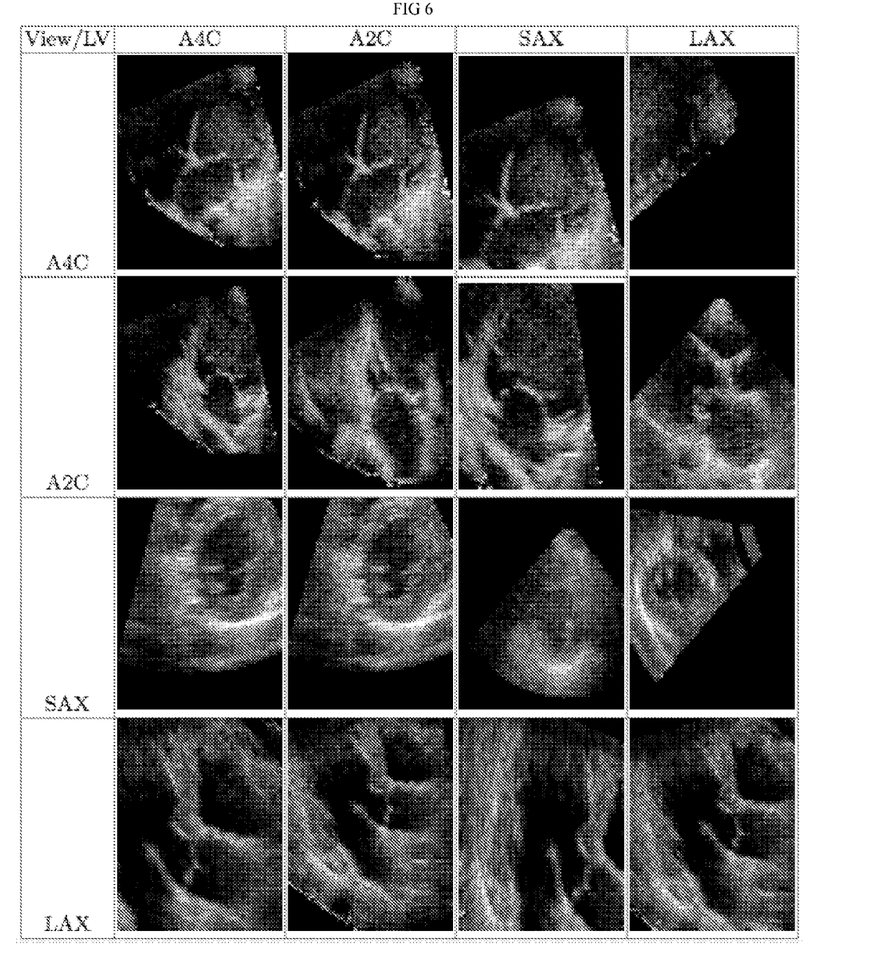
FIG. 6 is a matrix of images for data collection using four LV detectors according to an embodiment of the present disclosure.

This data collection process is repeated for each of the four views. A view-specific training image sets are obtained, with each set consisting of four subsets of global template images cropped from the training sequences belonging to four views. This is illustrated in FIG. 6, where a 4×4 matrix of images is created.

Referring to multiclass boosting: Given the training images for four views 206, the multiclass LogitBoost (ML-Boost, is employed to train a multiclass classifier 203. MLBoost is a generalized version of two-class LogitBoost, which is another interpretation of Ada-boosting using the forward additive logistic regression. The LogitBoost algorithm uses the Newton step to fit an additive symmetric logistic model that maximizes the multinomial likelihood.

The output of the MLBoost algorithm is a set of response functions $F_j(x)$, one for each class.

$$F_j(x) = \sum_m \alpha_{j,m} h_m(x). \quad (1)$$

The posterior probability of x being the $j^{th}$ view is given by $$p(j \mid x) = \frac{\exp(F_j(x))}{\sum_{i=1}^{J} \exp(F_i(x))} \quad (2)$$

These response functions $F_j(x)$ share the same so-called weaker learners (or weak classifiers) that are weighted differently for different views. The weak learners are selected and their coefficients are learned incrementally during boosting. Each weak learner is associated with a local image filter by assuming h(x) is a piecewise constant function of the filter response. Hence, boosting operates as a feature selection oracle.

Figure 7:
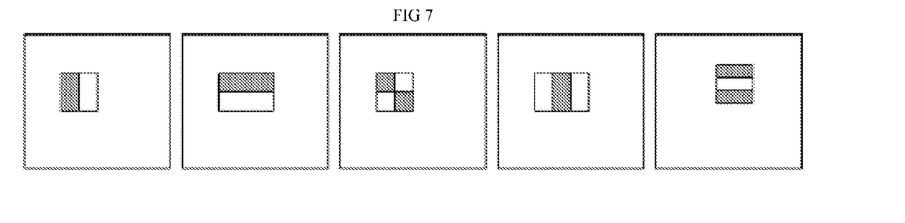
FIG. 7 illustrates Haar-like rectangle filters according to an embodiment of the present disclosure

The Haar-wavelet type local rectangle filters may be employed, which extract local high frequency along the various directions and at various resolutions. FIG. 7 shows five types of the filters, where the filter output is a scalar value by subtracting the sum of the intensity values in the white rectangle(s) from that of the grey rectangles. A large number of such filters may be produced by varying the filter type, location, and size (width and height). Evaluating the local rectangle features is almost instantaneous via the means of the integral image.

To discuss the training procedure, assume that N training images 206 are given from J classes ($N_j$ training data points for the $j^{th}$ class). The training data set is denoted as $\{(I_i, y_i)\}_{i=1}^{n}$, where $I_i$ represents $i^{th}$ training image, and is $y_i$ a J-dimensional class indicator vector of $1_i$. Suppose that M filters are generated. A matrix $X_{N \times M}$ may be defined whose $i^{th}$ row contains the M filter response collected from the image Ii $1_i$. Since each filter is considered as a weak classifier (WC), the training constructs a classifier by selecting filters among the filter pool for classification. The MLBoost algorithm may be expressed as:

1. Start with weights $w_{ij} = 1/N$, i = 1, 2, ..., N, j = 1, 2, ..., J,;
   $F_j(x) = 0$, and $p_j(x) = 1/J$ ∀j.
2. Repeat for m = 1, 2, ..., M:
   Repeat for j = 1, 2, ..., J:
      Compute working responses and weights in the $j^{th}$ class $$z_{ij} = \frac{y_{ij}^* - p_j(x_i)}{p_j(x_i)(1 - p_j(x_i))}; \quad (3)$$

$$w_{ij} = p_j(x_i)(1 - p_j(x_i)). \quad (4)$$

(A) Fit the function $f_{mj}(x)$ by a weighted least-squares regression of $z_{ij}$ to $x_i$ with weights $w_{ij}$.

Set $f_{mj}(x) \leftarrow \frac{J-1}{J}\left(f_{mj}(x) - \frac{1}{J}\sum_{k=1}^{J} f_{mk}(x)\right)$, and $F_j(x) \leftarrow F_j(x) + f_{mj}(x)$.

Update $p_j(x) \propto \exp(F_j(x))$.
3. Output the classifier arg $\max_j F_j(x)$.

where J is the number of classes.

As mentioned earlier, for each LV detector, a multiclass classifier is learned. The four classifiers may be denoted by p(j |x;k);k ∈ {a4c,a2c,sax,lax}.

Figure 8:
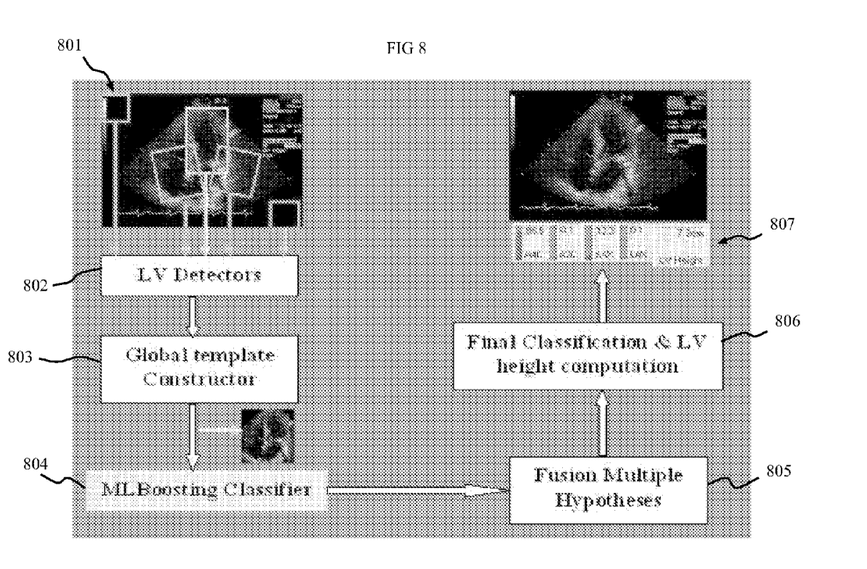
FIG. 8 is a flow chart of a method for an online classifier according to an embodiment of the present disclosure.

Referring now to online classification: In the run time, an echocardiographic video is classified through three stages: LV detection 201, and global view classification using multiview classifier 203, and final classification by multiple hypotheses fusion 204-205. In the first stage, the learned LV detectors (one LV detector per each view) localize the LV candidate region. As mentioned earlier, only the ED frame (and its neighboring frames if necessary) is used for classifying the query echo video. Referring to FIG. 8 (online classifier diagram), each LV detector 801 is applied by sliding a window on the ED frame from the top-left corner to bottom-right corner by changing the location, width, height and orientation.

The boxes, e.g., 801, represent the cropped images to be fed into the LV detectors 802, and color may be used to distinguish the correct LV box from the other boxes. The box that yields the maximum detector score is used for constructing the global template. Therefore, four LV windows are obtained and subsequently four global templates 803, one per view, that are denoted by $I_a4c$, $I_a2c$, $I_{sax}$, and $I_{lax}$, respectively.

The second stage classifies each global template 803 using the corresponding view-based multiclass classifier 804. Given four global templates 803, the following fusion strategy 805 is used to arrive at a final classification result 806.

$$p(j \mid I) = \sum_{k \in K} p(j \mid I_k; k) p(k) \quad (5)$$

$$= \frac{1}{4} \sum_{k \in K} p(j \mid I_k; k);$$

$K = \{a4c, a2c, sax, lax\}.$

Other fusion strategies can be applied. In the above, the prior probability is assumed to be uniform, where p(k)=¼. In practice, the prior information extracted from the LV appearance can be used.

Once the view is classified, the LV location can be determined accordingly and measurements about the LV calculated, such as the LV height, e.g., 807. Such measurements provides useful feedback to the sonographer for probe adjustment toward better image quality.

Referring now to exemplary results: In the training, a database of 478 A4C, 310 A2C, 175 SAX, and 117 LAX sequences has been used, with the LV endocardium annotated by experts. For testing, 96 A4C, 61 A2C, 28 SAX, and 38 LAX sequences were collected. Table 1 presents the confusion matrix of the view classification results on the training and test. On the average, a 96.8% accuracy was achieved on the training dataset and 96.4% accuracy on the test database, which are quite consistent with each other.

TABLE 1

The confusion matrix on the training and test data.

|  | A4C | A2C | SAX | LAX |
|---|---|---|---|---|
| Training | | | | |
| A4C (478) | 97.9% (468) | 1.7% (8) | 0.4% (2) | 0% (0) |
| A2C (310) | 3.9% (12) | 95.2% (295) | 0.6% (2) | 0.3% (1) |
| SAX (175) | 0.6% (1) | 1.1% (2) | 97.7% (171) | 0.6% (1) |
| LAX (117) | 0% (0) | 2.6% (3) | 2.6% (3) | 94.9% (111) |
| Test | | | | |
| A4C (96) | 97.9% (94) | 2.1% (2) | 0% (0) | 0% (0) |
| A2C (61) | 3.3% (2) | 93.5% (57) | 1.6% (1) | 1.6% (1) |
| SAX (28) | 3.6% (1) | 0% (0) | 96.4% (27) | 0% (0) |
| LAX (38) | 0% (0) | 0% (0) | 2.6% (1) | 97.4% (37) |

The location of the left ventricle is reported using a bounding box. To quantify the localization precision, calculate (i) the overlap ratio (OR) and (ii) the angle difference (AD). The OR is computed as $$OR = \frac{2 \text{area}(A \cap B)}{\text{area}(A) + \text{area}(B)}.$$

where A is the ground truth bounding box and B is the detected one. The AD is computed as the angle difference between the principal axes of A and B:

$$AD = \theta(A) - \theta(B),$$

where θ(A) is the principal axis angle of the box A. Table 2 reports the performance of the LV localization precision on the training data using the OR and AD measurements. Precision for the A4C sequences was determined; the average OR is about 88.3% and about 91.4% of the A4C sequence has an OR bigger than 80%; in terms of AD, its average AD is about 8.0°.

TABLE 2

The LV localization precision on the training data.

|  | $OR_{avg}$ | P[OR > .6] | P[OR > .7] | P[OR > .8] | $AD_{avg}$ | [|AD| ≤ 10°] |
|---|---|---|---|---|---|---|
| A4C | 88.3% | 98.5% | 97.3% | 91.4% | 8.0° | 78.7% |
| A2C | 88.6% | 99.4% | 98.4% | 92.6% | 7.1° | 82.9% |
| SAX | 80.0% | 93.7% | 85.7% | 65.7% | 12.0° | 50.3% |
| LAX | 79.0% | 94.9% | 91.0% | 51.3% | 12.3° | 53.8% |

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 9:
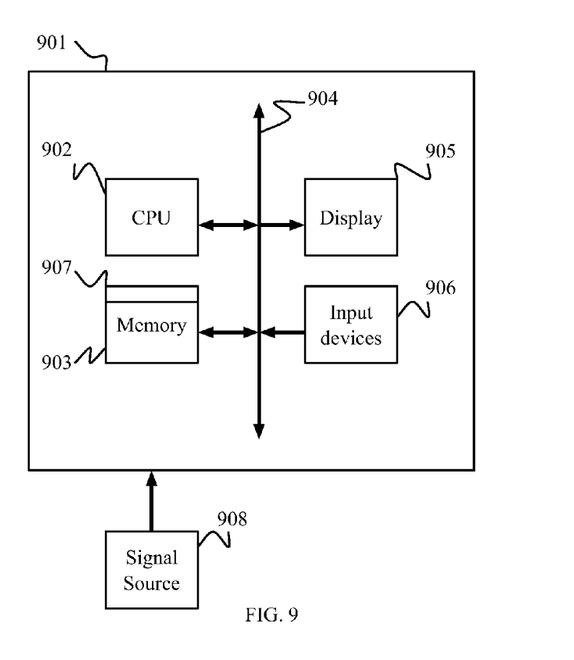
FIG. 9 is a diagram of a system according to an embodiment of the present disclosure.

Referring to FIG. 9, according to an embodiment of the present invention, a computer system 901 for cardiac view classification of echocardiography can comprise, inter alia, a central processing unit (CPU) 902, a memory 903 and an input/output (I/O) interface 904. The computer system 901 is generally coupled through the I/O interface 904 to a display 905 and various input devices 906 such as a mouse and keyboard. The support circuits can include circuits such as cache, power supplies, clock circuits, and a communications bus. The memory 903 can include random access memory (RAM), read only memory (ROM), disk drive, tape drive, etc., or a combination thereof. The present invention can be implemented as a routine 907 that is stored in memory 903 and executed by the CPU 902 to process a signal, e.g., a closed surface mesh, from the signal source 908. As such, the computer system 901 is a general purpose computer system that becomes a specific purpose computer system when executing the routine 907 of the present invention. The computer system 901 may further include a GPU 909 for processing certain operations.

The computer platform 901 also includes an operating system and micro instruction code. The various processes and functions described herein may either be part of the micro instruction code or part of the application program (or a combination thereof) which is executed via the operating system, In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for cardiac view classification of echocardiography, it is noted that modifications and variations can be made by persons skilled in the art in light of the above teachings.

It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable storage medium embodying instructions executed by a processor to perform a method for view classification, the method comprising:
   deriving a region of interest localizing an object of interest within an image for each of a plurality of detectors, wherein each detector is configured to detect a portion of the object of interest from a certain view, and each detector is configured for a different view of the object of interest;
   determining a global template for each of the regions of interest, wherein each global template is a bounding box larger than and including the region of interest, wherein the global template corresponds to a cropped portion of the image;
   performing a global view classification of the cropped portion of the image using a multiview classifier, wherein the multiview classifier outputs a classification for each of the global templates; and
   fusing the classifications of the global templates to determine a bounding box for the object of interest in the image.

2. The computer readable storage medium of claim 1, wherein the object of interest is a heart.

3. The computer readable storage medium of claim 1, wherein the region of interest includes a left ventricle of a heart.

4. The computer readable storage medium of claim 3, wherein the image is an end-diastolic frame of a heart.

5. The computer readable storage medium of claim 1, wherein the detectors are binary classifiers.

6. The computer readable storage medium of claim 1, wherein detecting the region of interest comprises:
   providing training images for each view; and
   training a binary classifier for each view.

7. The computer readable storage medium of claim 1, wherein the multiview classifier includes response functions, the response functions sharing weak classifiers that are weighted differently for each of the views, wherein each weak classifier is associated with a local image filter.

8. A system for view classification comprising:
   a memory device storing a plurality of instructions embodying a multiview classifier;
   a processor for receiving an image frame including an object of interest to be classified and executing the multiview classifier to perform a method comprising:
   deriving a region of interest localizing the object of interest within an image for each of a plurality of binary classifiers, wherein each binary classifier is configured to detect a portion of the object of interest from a certain view, and each binary classifier is configured for a different view of the object of interest;
   determining a global template for each of the regions of interest, wherein each global template is a bounding box larger than and including a respective region of interest, wherein the global template corresponds to a cropped portion of the image;
   performing a global view classification of the cropped portion of the image using a multiview classifier, wherein the multiview classifier outputs a classification for each of the global templates; and
   fusing the classifications of the global templates to determine a bounding box for the object of interest in the image.

9. The system of claim 8, wherein the object of interest is a heart.

10. The system of claim 8, wherein the region of interest includes a left ventricle of a heart.

11. The system of claim 8, wherein the image is an end-diastolic frame of a heart.

12. The system of claim 8, wherein detecting the region of interest comprises:
   providing training images for each view; and
   training a binary classifier for each view.

13. The system of claim 8, wherein the multiview classifier includes response functions, the response functions sharing weak classifiers that are weighted differently for each of the views, wherein each weak classifier is associated with a local image filter.

14. A method for view classification of a heart, the method comprising:
   deriving a region of interest localizing a heart within an end-diastolic image for each of a plurality of detectors, wherein each detector is configured to detect a portion of the heart from a certain view, and each detector is configured for a different view of the heart;
   determining a global template for each of the regions of interest, wherein each global template is a bounding box larger than and including a respective region of interest, wherein the global template corresponds to a cropped portion of the end-diastolic image;
   performing a global view classification of the cropped portion of the end-diastolic image using a multiview classifier, wherein the multiview classifier outputs a classification for each of the global templates;
   fusing the classifications of the global templates to determine a bounding box for the heart in the end-diastolic image; and
   determining measurements of the heart based on the bounding box for the heart.

15. The method of claim 1, wherein the multiview classifier includes response functions, the response functions sharing weak classifiers that are weighted differently for each of the views, wherein each weak classifier is associated with a local image filter.

16. The computer readable storage medium of claim 1, wherein the global template is determined as having a maximum detector score given the region of interest for a respective detector.

17. The system of claim 8, wherein the global template is determined as having a maximum detector score given the region of interest for a respective detector.

18. The method of claim 14, wherein the global template is determined as having a maximum detector score given the region of interest for a respective detector.

* * * * *